INVENTOR.
ROSCOE R. STITT.
BY
Barnes, Kisselle & Laughlin
ATTORNEYS

Oct. 10, 1939.     R. R. STITT     2,175,510
AIR BRAKE
Filed Feb. 9, 1932     2 Sheets-Sheet 2
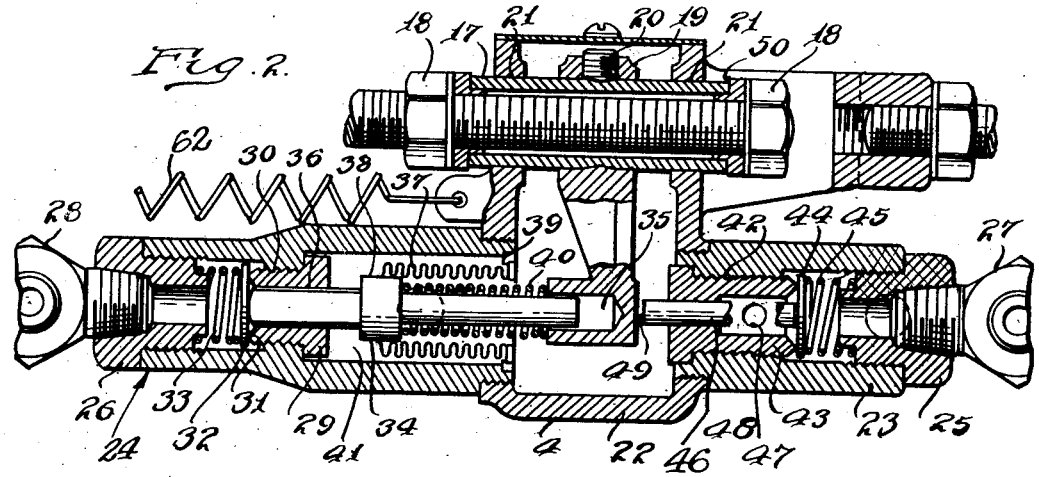
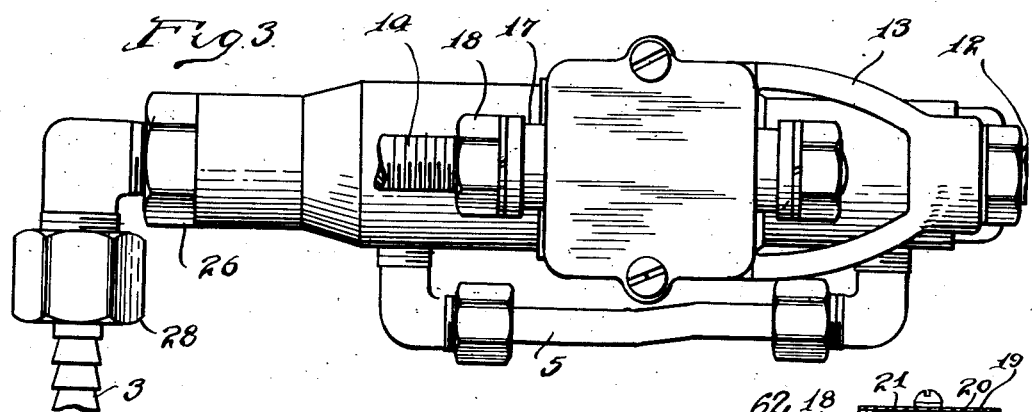
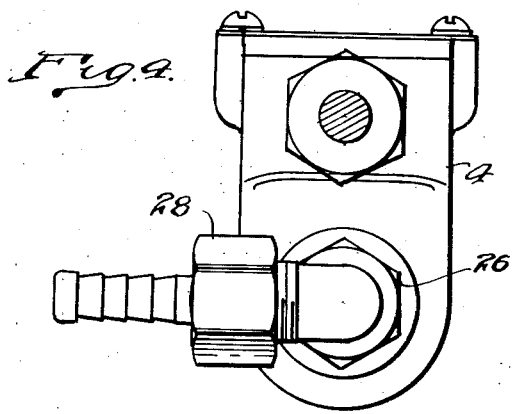
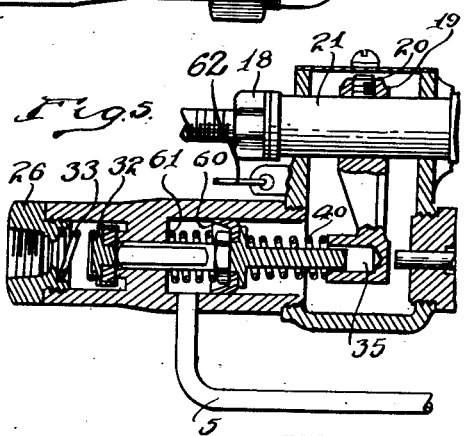
INVENTOR.
ROSCOE R. STITT.
BY
Barnes, Kisselle & Laughlin
ATTORNEYS Patented Oct. 10, 1939

2,175,510

UNITED STATES PATENT OFFICE 2,175,510

AIR BRAKE

Roscoe R. Stitt, Detroit, Mich., assignor to Auto-Motive-Air Brake Corporation, Detroit, Mich., a corporation of Michigan Application February 9, 1932, Serial No. 591,826

17 Claims. (Cl. 188—152)

This invention relates to an air brake and more particularly to the foot control valve which actuates an air brake adapted to be used in automobiles.

The foot control valve which I have devised is adapted to be used in a so-called "follow-up" air brake system. In such a system when the foot pedal is moved any distance the brakes are applied a corresponding degree which movement of the brakes results in a movement of the body of the valve with the result that the valve is closed. Thus, the amount of air which is permitted to enter the power cylinder is limited. Moreover, I have developed other means, which will be explained hereafter, for controlling the amount of air which may act upon the brakes, with the result that the operation of air brakes by my control valve will be more smooth than heretofore.

In the drawings:

Fig. 2 is an elevation in section of the foot control valve.

Fig. 3 is a top view of the valve.

Fig. 4 is an end view of the same.

Fig. 5 is a fragmentary sectional view illustrating a modified manner of substituting a piston for the bellows member shown in Fig. 2 for obtaining a differential action on the foot control valve.

Figure 1:
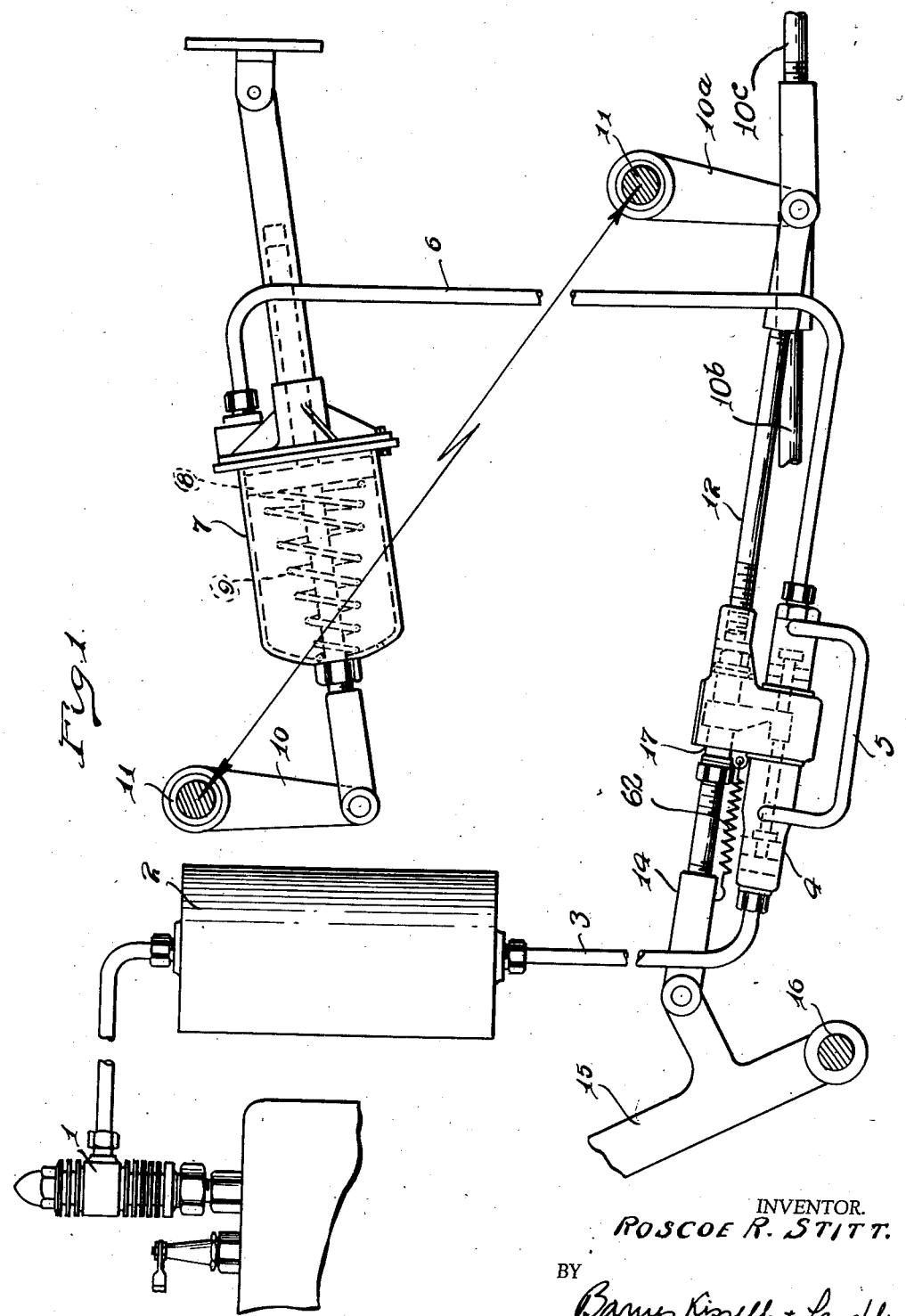
Fig. 1 is a diagrammatic sketch of my foot control valve in an air brake system.

Referring to the drawings, 1 represents an air accumulator and 2 an air tank. Upon leaving the tank the air passes through a pipe 3 and into one end of the casing 4 of the foot control valve. When the inlet valve is opened, in a manner to be described hereafter, the air may pass into the pipe 5, through the other end of the casing 4 and the pipe 6 to the power cylinder 7. When the air reaches this cylinder it acts upon the piston 8 against the pressure of the spring 9 to pivot the arm 10 about the cross shaft 11, thus applying the brakes through an arm 10a and front and rear brake rods 10b and 10c to brakes of the usual sort which need not be described here. This pivotal movement of the arm 10 results in a forward movement of the brake rod 12 which is directly connected to the yoke 13 of the central portion 22 of the casing 4 of the valve, resulting in the so-called "follow-up" motion.

In Fig. 1 it may be seen that the forward brake rod 14 is pivotally connected to the brake pedal 15, the latter being mounted on the shaft 16. The sliding sleeve 17 is fixed to the rear end of the forward brake rod 14 preferably by means of nuts such as 18. The finger 19 is fixed to the mid point of the sliding sleeve by means of the screw 20. The sleeve slidably engages the casing 4 in the openings 21.

The casing 4 is formed of a central portion 22 and the two end portions 23 and 24. The casing is formed with a longitudinal opening throughout its length, the ends having an interior threaded portion. Special units 25 and 26, positioned at the ends of the casing receive fittings 27 and 28 which connect pipes 6 and 3 with the ends of the casing. A guide 29 having a longitudinal opening is adapted to be threaded into the casing at a point 30 and at one end of the guide is a circular edge 31 which serves as a valve seat. The inlet valve is shown at 32 held against the valve seat by means of the spring 33 pressing against the inner end of the plug 26.

A grooved valve operating rod 34 is positioned within the recess 35 of the finger 19 at one end, and at the other end within the longitudinal opening 36 in the guide. A flexible metal bellows 37 is secured at one end to the enlarged portion 38 of the valve stem and at the other end to a ring 39 which is fixed to the casing at the central portion as shown in Fig. 2. The spring 40 is positioned around the valve stem between the enlarged portion 38 of the valve stem and the end of the finger.

The operation of the inlet valve may now be briefly explained. When the operator of the car presses his foot on the brake pedal the forward brake rod will move to the left as the mechanism is represented in Fig. 1. This will result in a movement of the sliding sleeve to the left with a resulting movement of the finger. As there is no connection between the finger and the valve stem beyond the spring, the spring 33 and the pressure of the air against the inlet valve 32 will hold the valve on its seat until the pressure of the spring 40 caused by a movement of the finger, is greater than the pressure of the air on the valve. When that point is reached the inlet valve will be opened and air will enter the chamber 41 to which is connected the by-pass pipe 5. The air may then pass through the pipe 5 and the pipe 6 and into the power cylinder 7. The function of the bellows is to prevent an excess of air entering the pipe lines and the cylinder. When the air enters the chamber 41 it presses against the enlarged portion 38 of the valve stem and against the bellows and tends to move both these members to the right and therefore to return the valve to its seat.

After the brake pedal has been applied the air pressure will have caused a movement of the piston 8 and a rotation of the shaft 11 resulting in a movement of the casing through the rod 12. This follow-up movement will always cause the casing to be moved to such an extent that the finger 19 will be returned to a point midway of the center portion of the casing, when the brake pedal is permitted to remain in any forward position. The purpose of the follow-up mechanism is to stop further flow of air to the cylinder when the pedal is held in a forward position and to enable the brakes to be released immediately when the pressure is removed from the brake pedal. It will be apparent, of course, that the pipes 3 and 6 will necessarily have to be flexible, in part at least, due to the movement of the casing.

The exhaust valve and its operation will now be described. The guide 42, having an externally threaded portion, is threaded into the end 23 of the casing from the center portion. At the outer end of the guide is the circular edge 43 which serves as a valve seat. The exhaust valve 44 is normally held against the seat by the spring 45 which presses against the end of the plug 25. The exhaust valve rod 46 is positioned within a longitudinal opening in the guide and is capable of longitudinal movement therein. The exhaust port 47 leads from the chamber 48 which is between the exhaust valve seat 43 and the inner end of the guide 42.

In operation when the brake pedal is moved forward and held in such position, the follow-up action will cause the casing to be moved so that the finger will again be in the midpoint of the center portion of the casing. The rod 46 will again assume a position whereby the end 49 of the rod will be adjacent to the finger. When the brake is released the sliding sleeve and the finger will be moved to the right as they are represented in Figure 2. This will cause the rod 46 to press against the exhaust valve 44, moving the latter from its seat, which will permit the air from the cylinder to pass through the end of the casing and out through the exhaust port.

An important feature of my invention is the mechanism which I have devised by which the brakes may be operated mechanically when the air pressure fails for any reason. When the brake pedal is applied, there being no air pressure, the sliding sleeve will be moved to the left until the shoulder 50 comes in contact with the central portion of the casing, and a mechanical connection between the brake pedal and the arm 10 is brought about which is as effective as a rigid connection. The advantage of this mechanism may be appreciated when it is seen that it can take care of a sudden unexpected loss of air pressure.

It will be evident from the foregoing description that I have devised a foot control valve having means for limiting the amount of air which may enter the power cylinder thus providing smoother operation, and having means to effect mechanical operation of the brakes in an emergency when the air pressure fails.

In the modification illustrated in Fig. 5 the operation is substantially the same as the unit shown in Fig. 2, the only material difference being that the bellows member 37 is replaced by a piston 60 which is preferably in the form of a flanged cup leather. The leather piston will act as an air seal not only because of the material used but because of the shape of the flange, the differential action between the valve, the valve stem which carries the piston 60, and the control finger being just as effective as when the bellows is a part of the combination. A coil spring 61 may be positioned between the differential member 60 and the end of the cylinder so that the only load carried by the spring 33 will be that of the valve itself.

In the operation of either of the control units shown in Fig. 2 or 5, the differential member comes into action immediately upon opening of the valve so that any movement of the valve for operating the brakes is accompanied by immediate movement in the opposite direction of the differential member tending to close the valve. For instance, as soon as the operator stops advancement of his foot, regardless of whether the amount of pressure is ten pounds, twenty pounds, or thirty pounds, etc., the differential member 37 or 60 immediately closes the valve and seals the operating system. This is true whether the braking pedal is moved forwardly or is released as the differential member 37 or 60 acts upon the pressure being released from the operating cylinder or upon the incoming pressure from the conduit 3.

In the commercial use of the present brake structure, a gauge has always been placed on the dash of the vehicle to indicate the pressure in the system. It has been found that if the operator presses the brake pedal forwardly so that ten pounds shows in the operating system and say ninety pounds in the supply tank, this ten pounds will stay substantially constant as long as the brake pedal is maintained in a given position. If the brake pedal remains in such position and through leakage or for some reason the system reduces to, say, about nine pounds, the control casing will have moved slightly with the result that the differential member is moved back, opening the valve and bringing the system up to ten pounds pressure once more. In most other systems of which I am aware, the maintenance of the brake pedal at one point will result in an equalization of the operating pressure in the system and the pressure in the supply tank. It will thus be seen that if the vehicle in going down a hill is moving too slow, the operator can release his foot very slightly and the effective brake pressure in the system will be slightly reduced, or he can move his foot ahead slightly with a resulting increase in effective braking pressure; in any event, it is not necessary at any time for the operator to return the brake pedal to any neutral position.

A preferred feature of the pressure control in the system during operation is the resilient connection between the finger 19 and the differential control member, which resilient connection permits the differential control member to fluctuate back and forth, opening and closing the valve 32 to maintain a constant pressure while the control finger 19 is held in a given position.

It will also be seen that my novel dead end braking cylinder 7 results in a comparatively small air displacement with a resulting immediate action. In other words, the piston 8 moves immediately with the introduction of air into the line while in many other systems where a stuffing box is used, it is necessary to fill up a large space before the piston is actuated. Furthermore, in many similar systems the use of a stuffing box has made necessary the use of diaphragms which in turn necessarily call for relatively large air displacement.

It will be understood the brake lever 15 and rod 14 have to be returned to normal position by some means, and in Figs. 1, 2 and 5 I have shown a spring 62 connecting the valve casing with the rod 14 for accomplishing this purpose. It will also be seen that the spring 62 will assist in quick positive operation of the valve structure, although as far as the valve operation itself is concerned, such spring 62 may be dispensed with.

The use of the term "differential means" in the specification and claims refers to the bellows member 37 or the piston member 60 in that one side of said bellows member and piston member is subjected to the pressure of either the main intake line or the back pressure of the brake cylinder air; these two pressures would normally be different, hence the term "differential"; this is to be distinguished from piston structure having different effective areas, the size of which determine differential action.

What I claim is:

1. A follow-up foot control valve for use in an air brake system of the class described, having in combination a casing directly connected to and movable with a brake actuating rod forming part of said system, a valve stem, bellows fixed at one end to said valve stem and at the other end to said casing, said casing having an outlet, an actuating finger, a valve seat, an inlet valve, a spring pressing said valve against said seat, a spring connecting said finger and said valve stem whereby a movement of said finger will cause a movement of said valve stem into contact with said valve and to move said valve from its seat, and means for actuating said finger.

2. In a fluid braking system, of the type having a brake actuating cylinder, a source of air supply, a power cylinder, a follow-up control valve unit positioned intermediate said two elements, said follow-up control valve unit including a housing and an actuating member having limited sliding movement relative to the housing, and inlet and exhaust valves actuated by said member, a differential member operatively connected to said actuating member on one side and being constantly exposed to the air pressure in the power cylinder on the other side, said differential member being operable by said operating member and being operable to control the opening and closing of the inlet valve relative to the air pressure in the system, as determined by said operating member.

3. In a fluid braking system, of the type having a brake actuating cylinder, a source of air supply, a power cylinder, a follow-up control valve unit positioned intermediate said two elements, said follow-up control valve unit including a housing and an actuating member having limited sliding movement relative to the housing, and inlet and exhaust valves actuated by said member, a differential member operatively connected to said actuating member on one side and being constantly exposed to the air pressure in the power cylinder on the other side, said differential member being operable by said operating member and being operable to control the opening and closing of the inlet valve relative to the air pressure in the system, as determined by said operating member, said differential member operating independently of the position of the operating member.

4. In a fluid braking system of the type having a brake pedal a brake mechanism a fluid power receptacle and a power cylinder, a freely movable casing connected to said brake mechanism, a sleeve slidably engaging said casing and connected to said brake pedal, a fluid line connecting said receptacle and said casing, a fluid line connecting said casing and said cylinder, a fluid valve adapted to interrupt the flow of fluid from said receptacle to said power cylinder, and means fixed to said sleeve adapted to actuate said valve, a differential piston positioned intermediate said valve and said means and subject to the pressure in said power cylinder.

5. In a fluid braking system of the type having a brake pedal a brake mechanism a fluid power receptacle and a power cylinder, a casing connected to said brake mechanism, a sleeve slidably engaging said casing, said sleeve being connected to said brake pedal, a fluid line connecting said receptacle to said casing, a piston in said cylinder mechanically connected to said brake mechanism, a fluid line connecting the interior of said casing and said cylinder, a fluid valve adapted to interrupt the flow of fluid from said receptacle to said power cylinder, an exhaust valve for the power cylinder, and a finger fixed to said sleeve adapted to actuate said valve, pressure operative means positioned between said valve and finger and a by-pass conduit connecting said power cylinder fluid with said means independently of said exhaust valve.

6. In a fluid brake system of the type having a brake pedal a brake mechanism a fluid power receptacle and a power cylinder, a casing connected to said brake mechanism, a sleeve slidably engaging said casing and connected to said brake pedal, a fluid line connecting said receptacle and said casing, a piston in said cylinder mechanically connected to said brake mechanism, a fluid line connecting said casing and said cylinder, and a fluid valve adapted to interrupt the flow of power fluid from said receptacle to said power cylinder, means for providing a mechanical connection between said casing and said sleeve when said fluid pressure has failed, an exhaust valve for the power cylinder, a finger fixed to said sleeve adapted to actuate said valve, pressure operative means positioned between said valve and finger, and a by-pass conduit connecting said power cylinder fluid with said means independently of said exhaust valve.

7. In a fluid brake system of the type having a brake pedal a brake mechanism a fluid power receptacle and a power cylinder, a casing connected to said brake mechanism, a sleeve slidably engaging said casing and connected to said brake pedal, a fluid line connecting said receptacle and said casing, a piston in said cylinder mechanically connected to said brake mechanism, a fluid line connecting said casing and said cylinder, a fluid valve adapted to interrupt the flow of power fluid from said receptacle to said power cylinder, said sleeve having a shoulder adapted to bear against said casing whereby there is a mechanical connection between said brake pedal and said brake mechanism when said fluid pressure has failed, and an exhaust valve for the power cylinder, a finger fixed to said sleeve adapted to actuate said valve, pressure operative means positioned between said valve and finger and a by-pass conduit connecting said power cylinder fluid with said means independently of said exhaust valve.

8. In a fluid brake system of the type having a brake pedal a brake mechanism a fluid power receptacle and a power cylinder, a casing connected to said brake mechanism and supported solely by the brake rod, means engaging said casing, said means being connected to said brake pedal, a fluid line connecting said receptacle and said casing, a fluid line connecting said casing and said power cylinder, and an inlet valve and an exhaust valve, means fixed to said first mentioned means whereby said means will directly actuate said inlet valve when said brake pedal is applied, and said means will directly actuate said exhaust valve when said brake pedal is released, a differential cylinder having pressure operative means connected to said second named means, said cylinder being continuously subjected to the fluid in said power cylinder and intermittently to the fluid power in said receptacle to assist in the follow up movement of the casing.

9. In a fluid brake system of the type having a brake pedal a brake mechanism a fluid power receptacle and a power cylinder, a casing connected to said brake mechanism, a sleeve slidably engaging said casing, said sleeve being connected to said brake pedal, a fluid line connecting said receptacle and said casing, a fluid line connecting said casing and said power cylinder, and an inlet valve and an exhaust valve, means fixed to said sleeve whereby said means will actuate said inlet valve when said brake pedal is applied, and said means will actuate said exhaust valve when said brake pedal is released, a differential cylinder positioned between said means and inlet valve and having pressure operative means connected to said first named means, said cylinder being continuously subjected to the fluid in said power cylinder and intermittently to the fluid power in said receptacle.

10. In an air brake structure of the type having a power actuating cylinder, a follow-up valve and casing, and inlet and exhaust valves in the casing actuated by a manually actuating operating member, the combination of an auxiliary cylinder formed in said casing and positioned between said member and inlet valve and in permanent communication with the fluid in said power cylinder, a sealing member in said cylinder operatively connected with the operating member and the inlet valve, and a permanently open conduit between said cylinder and the valve seat for the inlet valve.

11. In an air brake structure of the type having a power actuating cylinder, a follow-up valve and casing, and inlet and exhaust valves in the casing actuated by a manually actuating operating member, the combination of an auxiliary cylinder formed in said casing and positioned between said member and inlet valve and in permanent communication with the fluid in said power cylinder, a sealing member in said cylinder resiliently and operatively connected with the operating member and operatively connected with the inlet valve, and a permanently open conduit between said cylinder and the valve seat for the inlet valve.

12. In a braking system of the type having a brake control member, a source of working fluid and a power actuating cylinder, and a two-part follow-up valve comprising a housing and a valve operating member mechanically connecting said member and braking means, said housing including fluid inlet and outlet valves connecting said fluid source and said cylinder, said valve operating member and said control member being bodily movable relative to said housing, and differential means connected to said operating member and subject to operating fluid passing to or from said cylinder, and serving as an auxiliary control for the relative position of said two parts of the follow-up valve.

13. In a braking system of the type having a brake control member, a source of working fluid and a power actuating cylinder, and a two-part follow-up valve comprising a housing and a valve operating member mechanically connecting said member and braking means, said housing including fluid inlet and outlet valves connecting said fluid source and said cylinder, said valve operating member actuated by said control member being bodily movable relative to said housing, and differential means connected to said operating member and subject to operating fluid passing to or from said cylinder through said inlet and outlet valves and serving as an auxiliary control for the relative position of said two parts of the follow-up valve.

14. In an air brake system of the type having a brake actuating cylinder, a source of air supply, and a valve unit for controlling the flow of air to and from said cylinder including an inlet valve for admitting air to the unit and then to the cylinder means for actuating said inlet valve, differential means subject at all times to air pressure from said source or from said cylinder and normally counteracting said inlet valve actuating means when air under pressure is in the system, said differential means being operatively located between said valve operating means and the source of air supply and being operatively connected to the inlet valve for the system whereby to maintain a constant pressure within the system determined by the position of the valve operating means.

15. In a fluid brake system of the type having a brake actuating cylinder, a source of fluid supply, and a valve unit for controlling the flow of fluid to and from said cylinder including an inlet valve for admitting fluid to the unit and then to the cylinder, means for actuating said inlet valve, differential means subject at all times to fluid pressure from said source or from said cylinder and normally in communication with said cylinder and normally counteracting said inlet valve actuating means when operative fluid is in the system, said differential means being operatively located between said valve operating means and the source of air supply, a normally closed exhaust valve, and a by-pass conduit for directly connecting the actuating cylinder to said differential means.

16. In a fluid brake structure of the class described, a follow up valve unit including a casing, inlet and exhaust valves in said casing and an operating member actuated by the brake control means and slidably carried by the casing for actuating said inlet and exhaust valves, a cylinder forming a part of the casing and in communication at all times with the operating fluid in the system, and a sealing member in said cylinder operatively connected with the operating member and the inlet valve.

17. In a fluid brake structure of the class described, a follow up valve unit including a casing, inlet and exhaust valves in said casing and an operating finger actuated by the brake control means and slidably carried by the casing for actuating said inlet and exhaust valves, a cylinder forming a part of the casing and in communication at all times with the operating fluid in the system, and a sealing member in said cylinder operatively connected with the operating finger and operatively connected with the inlet valve.

ROSCOE R. STITT.